(12) United States Patent
Zhang et al.

(10) Patent No.: US 12,143,715 B2
(45) Date of Patent: Nov. 12, 2024

(54) OPTICAL DIVIDER FOR MULTI-FIELD OF VIEW CAMERA

(71) Applicant: ZEBRA TECHNOLOGIES CORPORATION, Lincolnshire, IL (US)

(72) Inventors: Ruth Zhang, Hauppauge, NY (US); David S. Koch, East Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 50 days.

(21) Appl. No.: 17/951,965

(22) Filed: Sep. 23, 2022

(65) Prior Publication Data

US 2024/0107159 A1    Mar. 28, 2024

(51) Int. Cl.
| | |
|---|---|
| H04N 23/667 | (2023.01) |
| G02B 26/08 | (2006.01) |
| G02B 27/12 | (2006.01) |
| H04N 23/51 | (2023.01) |
| H04N 23/55 | (2023.01) |
| H04N 23/53 | (2023.01) |

(52) U.S. Cl.
CPC ....... *H04N 23/667* (2023.01); *G02B 26/0883* (2013.01); *G02B 27/126* (2013.01); *H04N 23/51* (2023.01); *H04N 23/55* (2023.01); H04N 23/53 (2023.01)

(58) Field of Classification Search
CPC ...... H04N 23/667; H04N 23/51; H04N 23/55; H04N 23/53; G02B 26/0883; G02B 27/126
See application file for complete search history.

(56) References Cited

U.S. PATENT DOCUMENTS

| | | | | |
|---|---|---|---|---|
| 6,816,156 B2* | 11/2004 | Sukeno | ..... | G09G 5/10 348/E5.025 |
| 9,857,665 B2* | 1/2018 | Song | ..... | H04N 23/56 |
| 2008/0266443 A1* | 10/2008 | Lee | ..... | G02B 15/00 348/344 |
| 2009/0002797 A1* | 1/2009 | Kwong | ..... | H04N 23/58 348/E5.04 |
| 2009/0005112 A1* | 1/2009 | Sorek | ..... | H04N 23/50 348/294 |
| 2014/0055624 A1* | 2/2014 | Gaines | ..... | G02B 5/08 348/207.1 |
| 2014/0218587 A1* | 8/2014 | Shah | ..... | H04N 23/55 348/340 |
| 2016/0241764 A1* | 8/2016 | Luo | ..... | G03B 17/17 |
| 2020/0336631 A1* | 10/2020 | Biasini | ..... | H04N 23/62 |

* cited by examiner

*Primary Examiner* — Mekonnen D Dagnew

(57) ABSTRACT

A computing device includes: a housing having a plurality of sides defining a housing interior; a first outer lens disposed on a first side of the housing; a second outer lens disposed on a second side of the housing; an image sensor in the housing interior, the image sensor having first and second capture regions; an optical divider in the housing interior, the optical divider configured to (i) direct light from the first outer lens along a first optical path, and (ii) direct light from the second outer lens along a second optical path; and a lens assembly between the optical divider and the image sensor, the lens assembly configured to (i) focus light received along the first optical path onto the first capture region of the image sensor, and (ii) focus light received along the second optical path onto the second capture region of the image sensor.

18 Claims, 7 Drawing Sheets

OPTICAL DIVIDER FOR MULTI-FIELD OF VIEW CAMERA

BACKGROUND

A mobile computing device, such as a tablet computer, a smart phone, or the like, may include multiple cameras, e.g., a forward-facing camera and a rear-facing camera. Accommodating hardware components for multiple cameras, along with hardware components for the variety of additional functions implemented by the device, may increase the complexity and/or cost of manufacturing and/or assembling the device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
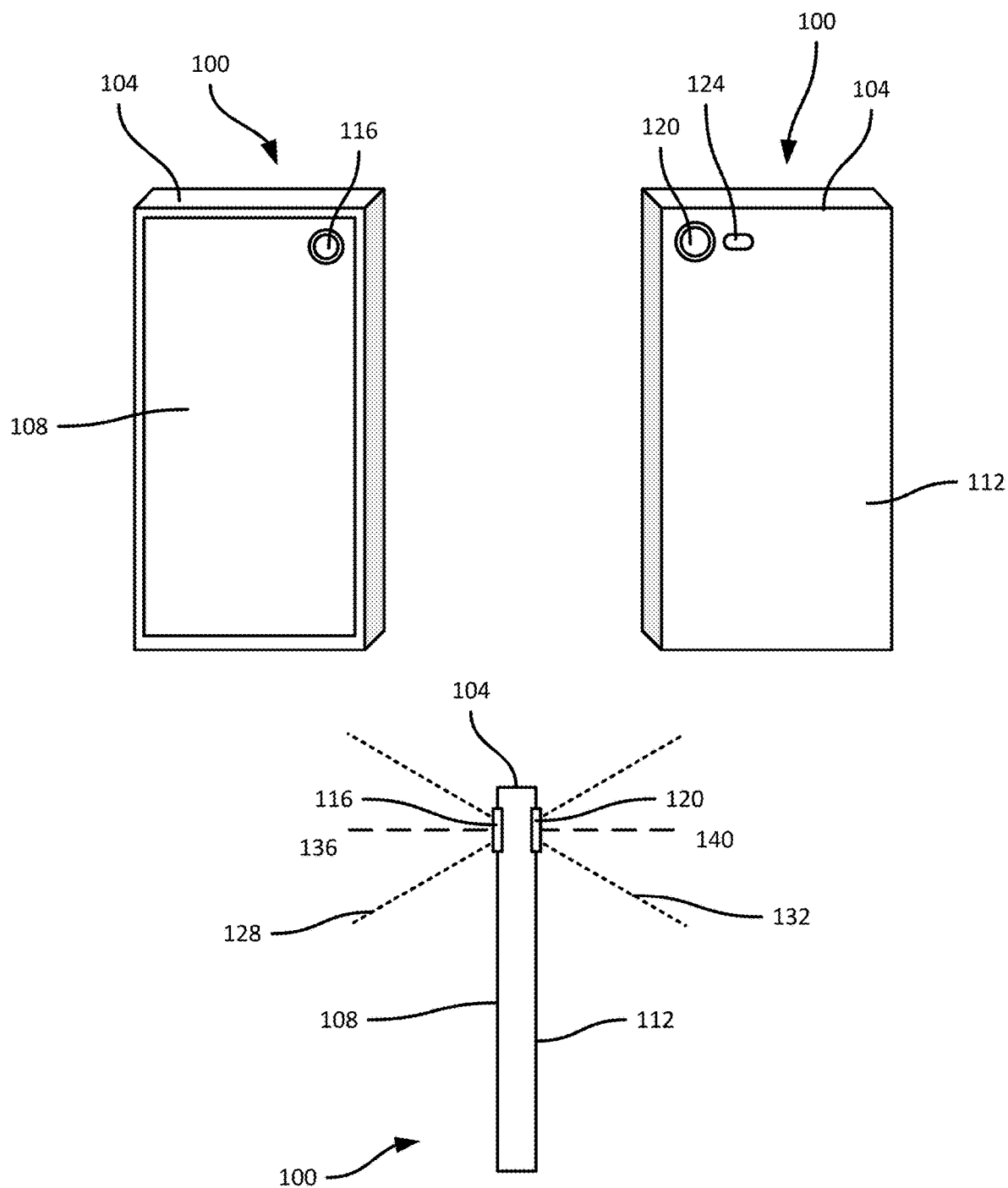
FIG. 1 is a diagram of front, back, and side views of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, comprising: a housing having a plurality of sides defining a housing interior; a first outer lens disposed on a first side of the housing; a second outer lens disposed on a second side of the housing; an image sensor in the housing interior, the image sensor having first and second capture regions; an optical divider in the housing interior, the optical divider configured to (i) direct light from the first outer lens along a first optical path, and (ii) direct light from the second outer lens along a second optical path; and a lens assembly between the optical divider and the image sensor, the lens assembly configured to (i) focus light received along the first optical path onto the first capture region of the image sensor, and (ii) focus light received along the second optical path onto the second capture region of the image sensor.

Additional examples disclosed herein are directed to a method in a computing device, the method comprising: at a processor of the computing device, receiving an image capture command; selecting, based on the image capture command, at least one of (i) a first capture region of an image sensor of the computing device and (ii) a second capture region of the image sensor; selecting a configuration for an optical divider of the computing device, the optical divider configured to (i) direct light from a first outer lens along a first optical path towards the first capture region, and (ii) direct light from a second outer lens along a second optical path towards the second capture region; activating the image sensor according to the selected at least one capture region; and storing captured image data responsive to activating the image sensor.

Further examples disclosed herein are directed to a computing device, comprising: a housing having a plurality of sides defining a housing interior; a first cover lens disposed on a first side of the housing; a second cover lens disposed on a second side of the housing; an image sensor in the housing interior; an optical divider in the housing interior, the optical divider configured to (i) direct light from the first outer lens along a first optical path, and (ii) direct light from the second outer lens along a second optical path; and a lens assembly between the optical divider and the image sensor, the lens assembly configured to (i) focus light received along the first optical path onto at least a first portion the image sensor, and (ii) focus light received along the second optical path onto at least a second portion of the image sensor.

FIG. 1 depicts a mobile computing device 100 (also referred to herein as the mobile device 100 or the device 100), such as a smartphone. The mobile computing device 100 can be implemented in a wide variety of other form factors in other embodiments, including a tablet computer, a laptop computer, a handheld digital camera, or the like.

The device 100 includes a housing 104 supporting and/or enclosing other components of the device 100 and defining the outer surface(s) of the device 100. The upper left hand portion of FIG. 1 illustrates the device 100 from the front (e.g., the operator-facing portion of the device 100, when the device 100 is in use), while the upper right hand portion of FIG. 1 illustrates the device 100 from the rear (e.g., facing away from an operator when the device 100 is in use). The housing 104 supports a display 108, e.g., with an integrated touch screen, such that the display 108 and the surrounding portion of the housing 104 (e.g., a bezel around a perimeter of the display 108) form a first side of the device 100. The first side can also be referred to as a forward, or front, side of the device 100. The housing 104 further defines a rear, or back, side 112 of the device 100, opposite the front side including the display 108.

The device 100 can include a variety of additional components, such as input devices (e.g., microphones, keys or buttons), output devices (e.g., speakers, indicator lights), communications ports, and the like. Among those components are at least a first outer lens 116 on the front side, e.g., set in an aperture through the display 108, and a second outer lens 120. The outer lenses 116 and 120, also referred to as cover lenses or exit windows, can be implemented as flat transparent elements, and define openings through the housing 104, permitting light to enter the housing 104, e.g., for capture by an image sensor. In other words, the outer lenses 116 and 120 enable the collection of light for camera functions provided by the device 100. The device 100 can also include a light emitter, such as a flash light emitting diode (LED), e.g., adjacent to the second outer lens 120 to illuminate a camera field of view.

The outer lenses 116 and 120 need not be refractive. For example, the device 100 can include additional optical elements within the housing 104, at least some of which are refractive, for directing and focusing light entering the outer lenses 116 and 120 onto an image sensor also disposed within the housing 104.

As shown in the lower portion of FIG. 1, which illustrates the device 100 from an edge between the front side and the rear side 112, the outer lenses 116 and 120 define fields of view (FOVs) 128 and 132, respectively, having central axes 136 and 140. The FOVs 128 and 132 are volumes of space, e.g., pyramidal in shape, from which light can enter the corresponding outer lens 116 or 120 and impact an image sensor supported within the housing 104, enabling the device 100 to capture images of portions of the environment of the device 100. As seen in FIG. 1., the FOVs 128 and 132 are oriented in opposite directions, with the FOV 128 being forward facing, and the FOV 132 being rear-facing. In the present examples the FOVs 128 and 132 are co-axial (that is, the axes 136 and 140 lie on a single common line), but in other examples, the FOVs 128 and 132 need not be co-axial. Further, in some examples the FOVs 128 and 132 can be angled relative to one another by less than 180 degrees (as illustrated in FIG. 1). For example, one FOV can be forward-facing, while another FOV can be top-facing, at an angle of about 90 degrees relative to the forward-facing FOV.

Camera functions with distinct FOVs facing in distinct directions, as shown in FIG. 1, can be implemented by providing the device 100 with separate camera hardware components, such as two distinct lens assemblies and image sensors. In such examples, capturing an image of scenery within the forward-facing FOV 128 involves activating a first image sensor, while capturing an image of scenery within the rear-facing FOV 132 involves activating a second image sensor.

Deploying a plurality of separate sets of camera components (e.g., lens assemblies and image sensors), however, can increase the cost and complexity of the device 100, and potentially complicate the assembly of the device 100. Further, multiple sets of camera components may be difficult to accommodate within the housing 104, which also houses a wide variety of other components (e.g., antennas and other communications hardware, processing components, the previously mentioned speakers, microphones and the like).

The device 100 therefore provides two or more camera functions, with distinct FOVs (e.g., the FOVs 128 and 132), while deploying a single image sensor and lens assembly within the housing 104 to implement those camera functions. In particular, as discussed below, the device 100 includes an image sensor and lens assembly, and an optical divider configured to direct light from the outer lenses 116 and 120 to capture regions on the image sensor, via the lens assembly. In other words, although the device 100 can implement both forward- and rear-facing camera functions (or other camera orientations, as noted earlier), the device 100 employs the same lens assembly and image sensor for such camera functions, thus reducing the quantity of camera-related hardware components to be accommodated within the housing.

Figure 2:
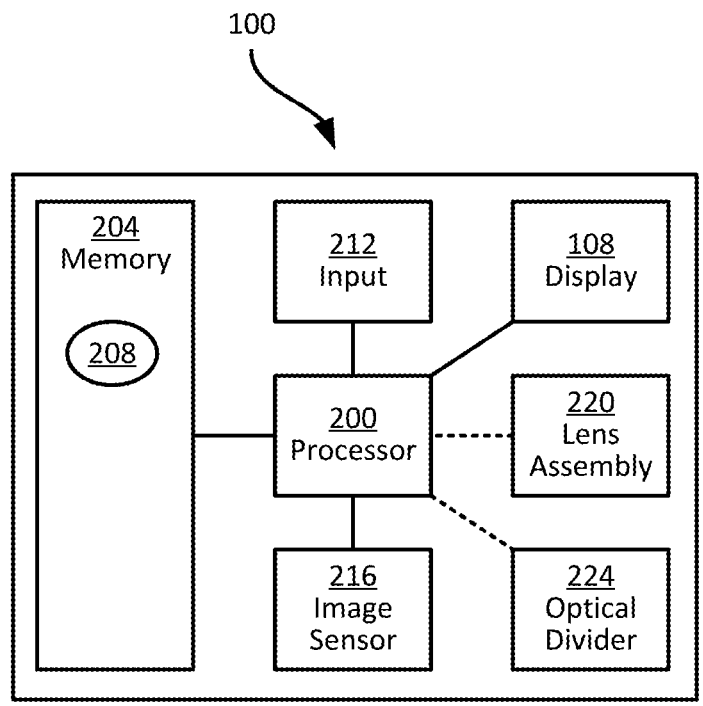
FIG. 2 is a diagram of certain internal components of the device of FIG. 1.

FIG. 2 illustrates certain internal components of the device 100. The device 100 can include a processor 200, such as a central processing unit (CPU), graphics processing unit (GPU), application-specific integrated circuit (ASIC), or combination thereof. The processor 200 is connected with a non-transitory computer-readable storage medium, such as a memory 204 (e.g., a suitable combination of volatile and non-volatile memory elements), configured to store a plurality of computer-readable instructions executable by the processor 200 to perform various functionality via control of the remaining components of the device 100. For example, the memory 204 can store a camera application 208, execution of which by the processor 200 can configure the processor 200 to control other components of the device 100 to capture images via either or both of the outer lenses 116 and 120.

The device 100 also includes the display 108 as noted in connection with FIG. 1. Further, the device 100 includes an input device 212, such as a touch screen integrated with the display 108, a keypad, a microphone, or the like. The device 100 further includes an image sensor 216 connected with the processor 200, as well as a lens assembly 220 arranged to focus light onto the image sensor for capturing images. The lens assembly 220 can be fixed in some examples, in which case the lens assembly 220 need not be communicatively coupled with the processor 200. In other examples, e.g., in which the device 100 provides an optical zoom function, the lens assembly 220 can include movable components, connected with the processor 200 for control thereof. The connection between the lens assembly 220 and the processor 200 is shown in dashed lines to illustrate that there need not be communication between the processor 200 and the lens assembly 220 in some examples.

As noted above, the image sensor 216 and lens assembly 220 implement more than one camera function, e.g., forward and rear-facing camera functions. To enable the image sensor 216 and lens assembly 220 to implement a plurality of distinct camera functions, the device 100 also includes an optical divider 224. The optical divider, discussed in greater detail below, is configured to direct light from the outer lens 116 along a first optical path to a first capture region of the image sensor 216, and to direct light from the outer lens 120 along a second optical path to a second capture region of the image sensor 216. The optical divider 224, in other words, divides a total sensor area of the single image sensor 216 into capture regions, such that distinct images corresponding to the FOVs 128 and 132 can be captured by the image sensor 216. The connection between the processor 200 and the optical divider 224 is shown as a dashed line, as certain embodiments of the divider 224 can be actively controlled by the processor 200, while in other embodiments the divider 224 is passive and therefore does not require a connection with the processor 200.

Figure 3:
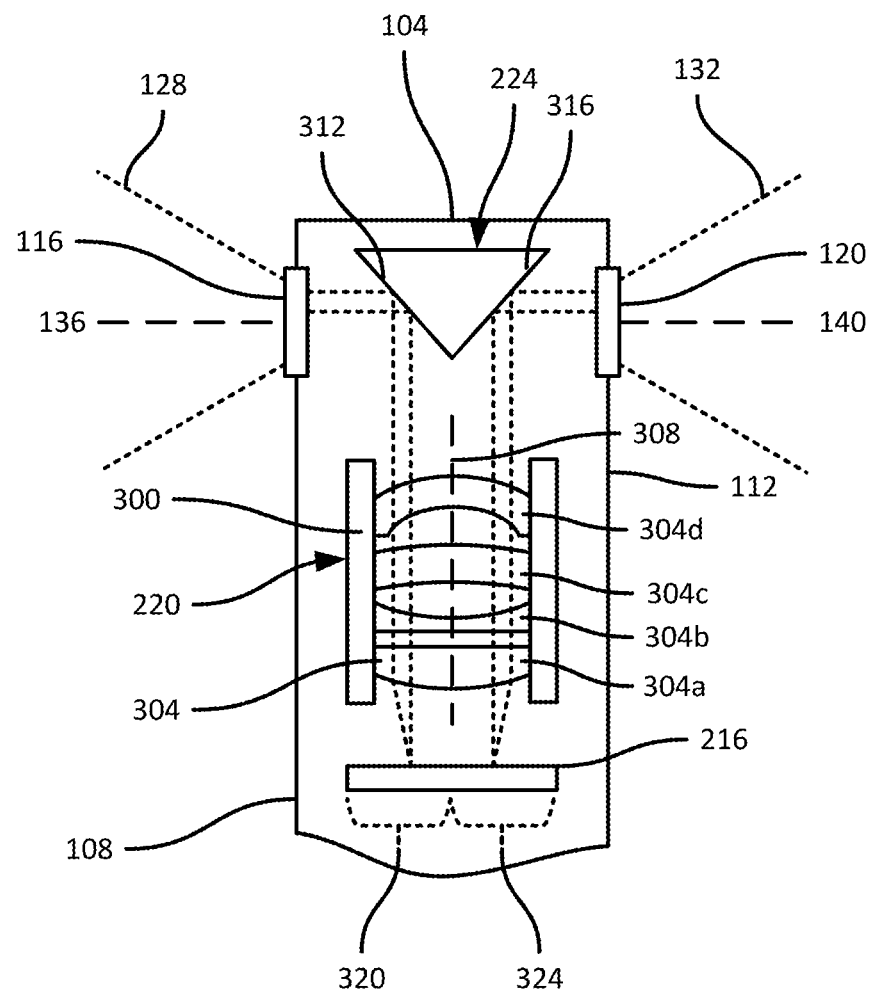
FIG. 3 is a diagram illustrating an example optical divider of the device of FIG. 1.

Turning to FIG. 3, a portion of an interior of the housing 104, bounded by the display 108 and the rear side 112 of the housing 104, is illustrated. In particular, the lens assembly 220 and the image sensor 216 are visible within the housing 104. As shown in FIG. 3, the lens assembly 220, which includes a barrel 300 supporting one or more lens elements 304 (e.g., any suitable combination of plano-convex lenses 304a, plano-concave lenses 304b, meniscus lenses 304c and 304d, double convex lenses, double concave lenses, aspheric lenses, and the like), has an optical axis 308 that is substantially perpendicular to the sensor plane of the image sensor 216. Further, in the illustrated example the axes 136 and 140 of the FOVs 128 and 132 are substantially perpendicular to the optical axis 308.

The optical divider 224, in the embodiment illustrated in FIG. 3, includes first and second reflective surfaces 312 and 316, e.g., configured to reflect light entering the outer lenses 116 and 120 respectively towards the lens assembly 220. Specifically, the first reflective surface 312 is configured to direct light entering the outer lens 116 along a first optical path (shown in dashed lines extending from the outer lens 116, through the lens assembly 220 and terminating at the image sensor 216) to a first capture region 320 of the image sensor 216. The second reflective surface 316 is configured to direct light received through the outer lens 120 along a second optical path (shown in dashed lines extending from the outer lens 120, through the lens assembly 220 and terminating at the image sensor 216), via the lens assembly 220, to a second capture region 324 of the image sensor 216.

The capture regions 320 and 324 are each defined by distinct portions of a total sensor area of the image sensor 216. For example, as illustrated in FIG. 3, the first and second capture regions 320 and 324 each represent one half of a total sensor area of the image sensor 216. The capture regions 320 and 324 are non-overlapping, such that one capture region is a portion of the total sensor area (e.g., 50%), and the other capture region is the remainder of the total sensor area (e.g., the other 50%). In other examples, the total sensor area of the image sensor 216 need not be equally divided between the capture regions 320 and 324. For example, a greater portion of the image sensor 216 (e.g., 70%) can be allocated to the rear-facing camera function than the forward-facing camera function (e.g., 30%).

In the example of FIG. 3, the optical divider 224 is a passive divider, i.e., not requiring active control by the processor 200. The optical divider 224 can be, for example, a right-angle prism, mirror, or the like. As will be apparent, the position of the divider 224, as well as the orientations of the reflective surfaces 312 and 316, can be selected to provide a target division of the image sensor 216 between the capture regions 320 and 324.

Figure 4:
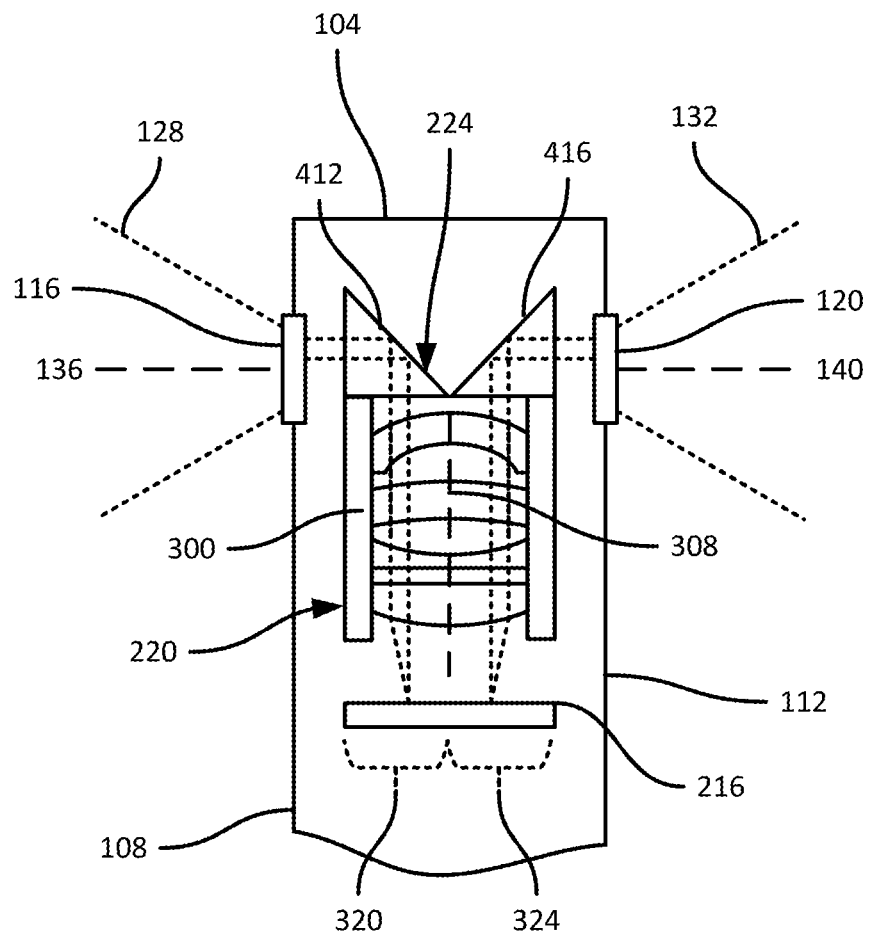
FIG. 4 is a diagram illustrating another example optical divider of the device of FIG. 1.

FIG. 4 illustrates another embodiment of the optical divider 224, including reflective surfaces 412 and 416 performing the functions set out above in connection with the reflective surfaces 312 and 316. In the embodiment of FIG. 4, however, the reflective surface 412 is provided by a first prism (e.g., a right-angle prism in this embodiment), and the reflective surface 416 is provided by a second prism. The above-mentioned prisms can be affixed to the barrel 300. For example, the image sensor 216, lens assembly 220, and optical divider 224 can be manufactured and assembled as a sub-assembly that can then be installed into the housing 104 during assembly of the device 100.

As will be apparent to those skilled in the art, in the embodiments shown in FIG. 3 and FIG. 4, images can be captured simultaneously corresponding to each of the capture regions 320 and 324. The processor 200 can, for example, obtain (e.g., via the instructions of the application 208) data defining the capture regions 320 and 324 (e.g., identifiers of the pixel coordinates, rows, or the like of the image sensor 216 that correspond to the capture regions 320 and 324. The processor 200 can then capture image data from either or both of the capture regions 320 and 324. The processor 200 can be configured to select the capture region(s) to obtain image data from based on an image capture command received from the input device 212. For example, the image capture command can be one of a forward-facing capture command, a rear-facing capture command, or a dual capture command (i.e., forward and rear-facing images captured simultaneously). The processor 200 can therefore select the capture region(s) corresponding to the image capture command in order to obtain image data for storage in the memory 204, rendering on the display 108, or the like.

Figure 5:
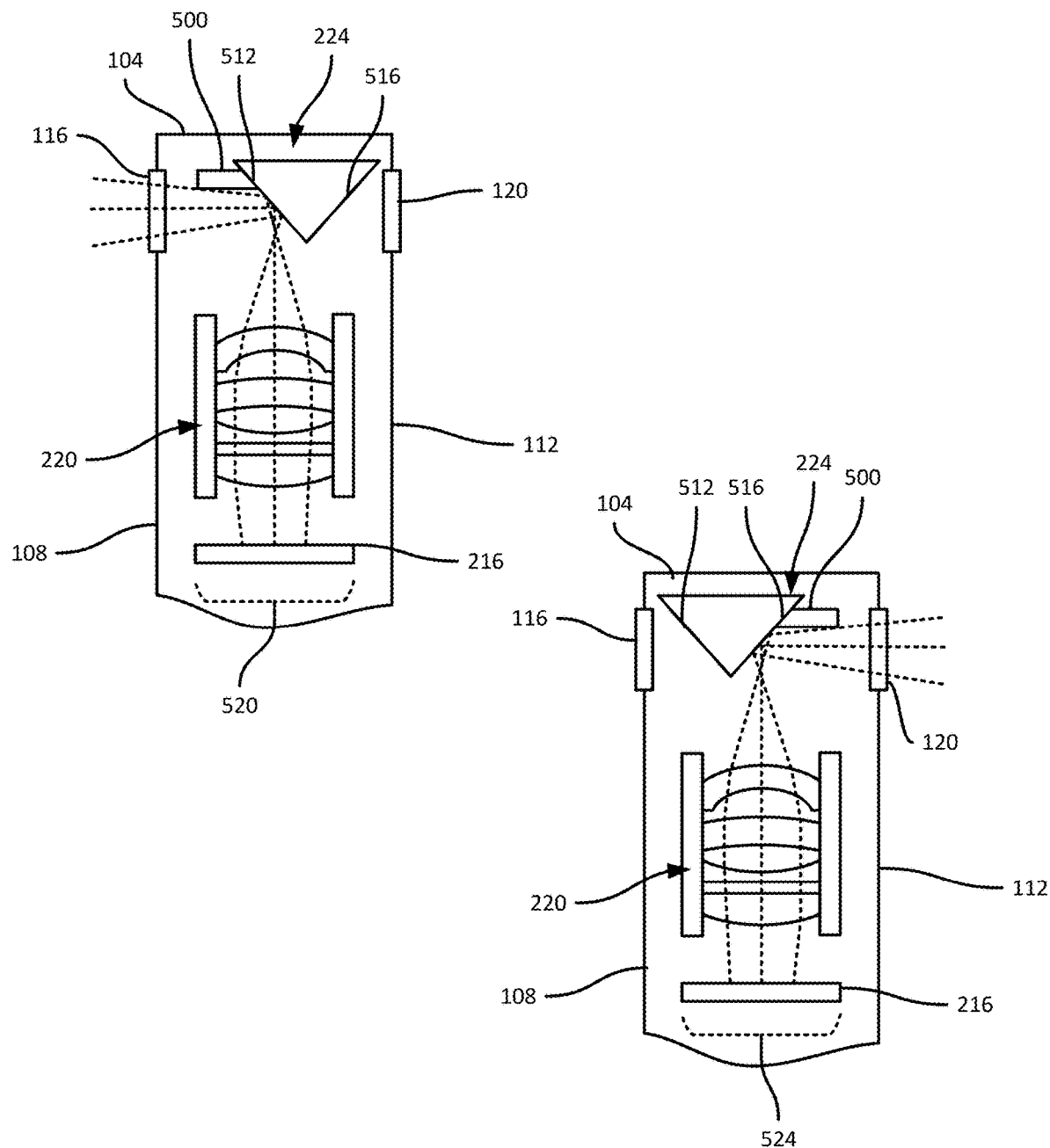
FIG. 5 is a diagram illustrating a further example optical divider of the device of FIG. 1.

Turning to FIG. 5, in other examples, selection of the capture regions 320 and 324 can be mutually exclusive. For example, the optical divider 224 as shown in FIG. 5 includes an actuator 500 (e.g., a linear actuator such as a solenoid or the like), and a prism, mirror, or the like, defining a first reflective surface 512 and a second reflective surface 516. The prism is movable by the actuator 500, between a first position (shown in the top-left of FIG. 5) and a second position (shown in the bottom-right of FIG. 5). In the first position, the divider 224 directs light from the outer lens 116 along the first optical path to a first capture region 520, while in the second position the divider 224 directs light from the outer lens 120 along the second optical path to a second capture region 524. In the first position, the divider 224 does not direct light to the second capture region 524, while in the second position, the divider 224 does not direct light to the first capture region 520. As seen in FIG. 5, the first and second capture regions 520 and 524 include overlapping portions of the image sensor 216, rather than consisting of distinct portions of a total area of the image sensor 216. In some examples, the capture regions 520 and 524 can overlap completely, such that in both positions, the divider directs light to the entire area of the image sensor 216. In other examples, the capture regions can overlap but remain at least partly distinct.

Figure 6:
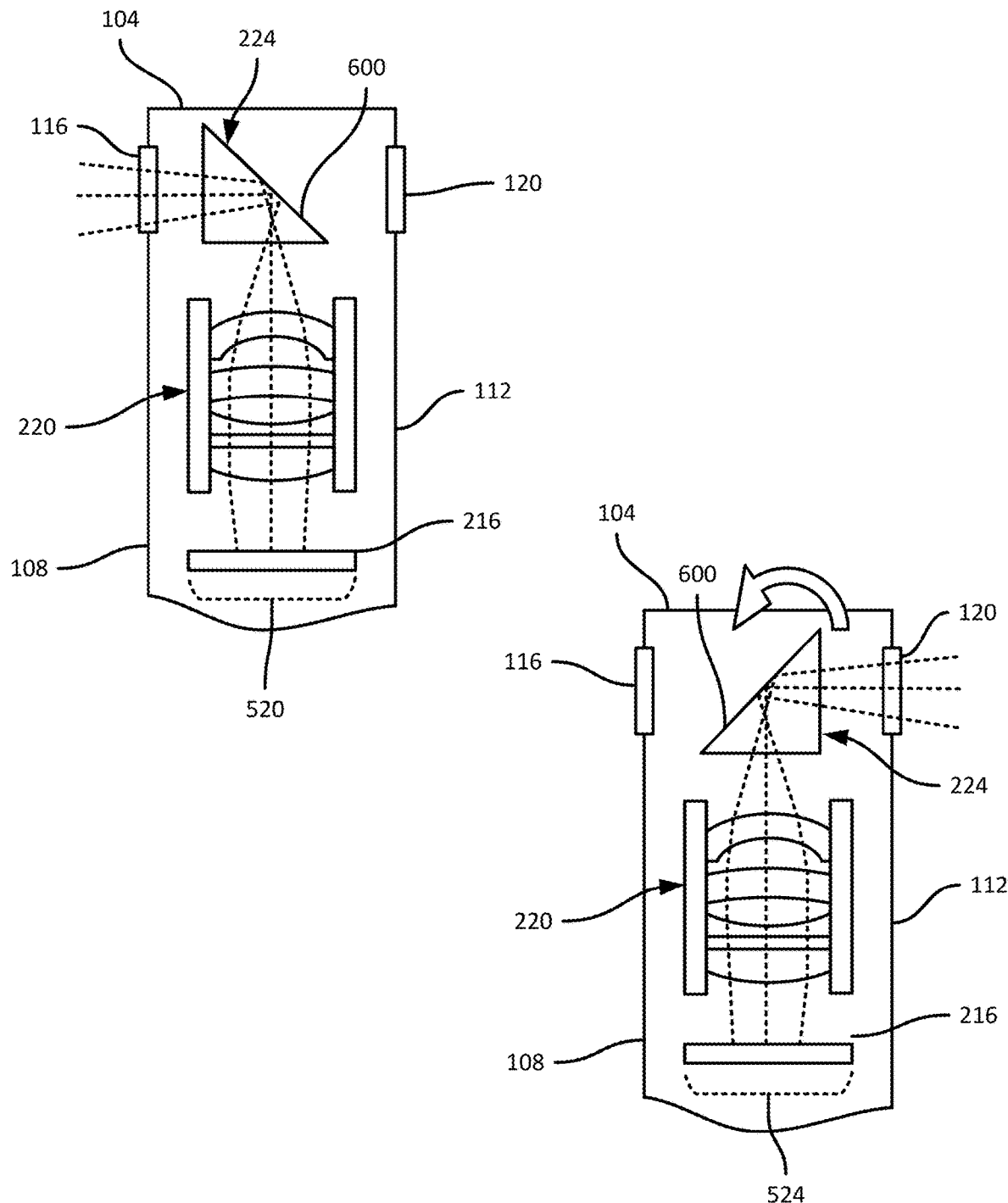
FIG. 6 is a diagram illustrating a further optical divider of the device of FIG. 1.

FIG. 6 illustrates a further embodiment, in which the divider 224 includes a prism that is movable between first and second positions (shown in the top-left and bottom-right portions of FIG. 6, respectively). The prism includes a reflective surface 600 configured to direct light to either the first capture region 520, in the first position, or to the second capture region 524, in the second position. That is, rather than distinct reflective surfaces, the divider 224 has one reflective surface that directs light to either of the capture regions 520 and 524, based on the current position of the divider 224. The divider 224 can also include a rotational actuator, e.g., to rotate the prism through an angle of about 90 degrees between the first and second positions. As with the embodiment shown in FIG. 5, the capture regions 520 and 524 in the embodiment of FIG. 6 overlap, and in some examples can each occupy the entirety of the image sensor 216.

Figure 7:
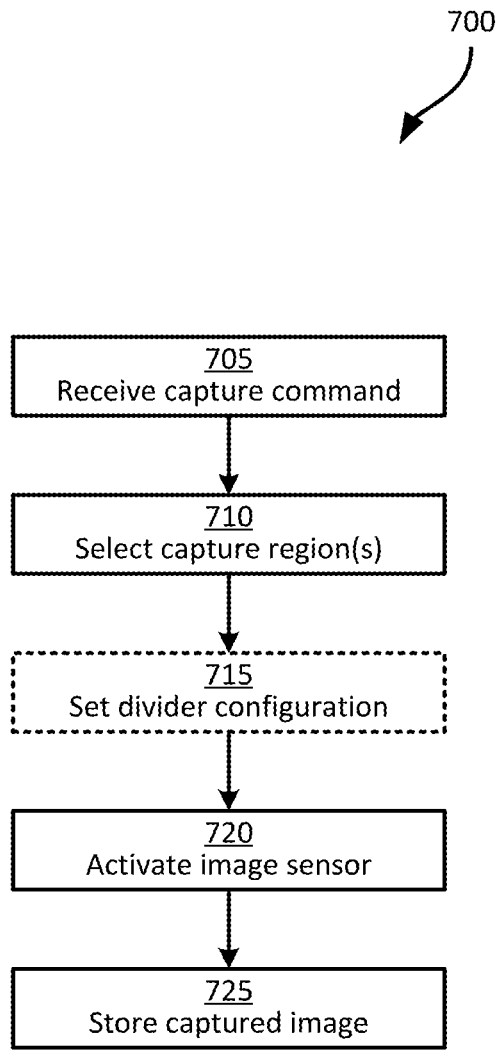
FIG. 7 is a flowchart illustrating a method of image capture in the device of FIG. 1.

Turning to FIG. 7, a method of image capture 700 is illustrated, e.g., performed by the processor 200 via execution of the application 208. At block 705, the processor 200 can receive an image capture command, e.g., via the input device 212. The image capture command can specify one of a plurality of camera functions implemented by the application 208. For example, the command can be selected from a forward-facing image capture, a rear-facing image capture, or simultaneous forward and rear-facing image captures, as noted earlier. In other examples, the image capture command can be selected from a rear-facing image capture and a barcode scan, e.g., in embodiments in which one of the capture regions 320 and 324 is sized to perform barcode detection. For example, the capture region 320 can occupy about 10% of the total sensor area, for use in capturing and decoding barcodes, while the capture region 234 can occupy about 90% of the total sensor area.

At block 710, the processor 200 is configured to select one or more capture regions according to the command received at block 705. For example, the processor 200 can access a mapping of image capture commands to capture regions stored in the application 208, and select the capture region(s) corresponding to the received command.

At block 715, when the optical divider 224 is actively controlled (e.g., as shown in FIGS. 5 and 6), the processor 200 can activate the actuator to place the divider 224 in the position corresponding to the selection capture region from block 710. In embodiments with a passive divider 224, block 715 can be omitted.

At block 720, the processor 200 is configured to activate the image sensor 216, or at least the portion thereof corresponding to the selected capture region(s) from block 710. The processor 200 thereby obtains image data from the selected capture region(s), which can be rendered, stored, and/or otherwise processed at block 725.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
   a housing having a plurality of sides defining a housing interior;
   a first outer lens disposed on a first side of the housing, the first outer lens defining a first FOV with a first FOV axis;
   a second outer lens disposed on a second side of the housing, the second outer lens defining a second FOV with a second FOV axis, wherein the first FOV axis and the second FOV axis are substantially co-axial;
   an image sensor in the housing interior, the image sensor having first and second capture regions;
   an optical divider in the housing interior, the optical divider configured to (i) direct light from the first outer lens along a first optical path, and (ii) direct light from the second outer lens along a second optical path; and
   a lens assembly between the optical divider and the image sensor, the lens assembly configured to (i) focus light received along the first optical path onto the first capture region of the image sensor, and (ii) focus light received along the second optical path onto the second capture region of the image sensor.

2. The computing device of claim 1, further comprising: a display on the first side; wherein the second side is a rear side opposite the display.

3. The computing device of claim 1, wherein the image sensor has a total sensor area;
   wherein first capture region is a portion of the total sensor area; and
   wherein the second capture region is a remainder of the total sensor area.

4. The computing device of claim 3, wherein the portion of the total sensor area and remainder of the total sensor area are substantially equal.

5. The computing device of claim 1, wherein the optical divider comprises:
   a first fixed reflective surface to direct light from the first outer lens along the first optical path; and
   a second reflective surface to direct light from the second outer lens along the second optical path.

6. The computing device of claim 5, wherein the optical divider comprises a prism including the first and second reflective surfaces.

7. The computing device of claim 5, wherein the optical divider comprises a first prism defining the first reflective surface, and a second prism defining the second reflective surface.

8. The computing device of claim 7, wherein the first and second prisms are affixed to a barrel of the lens assembly.

9. The computing device of claim 1, wherein the optical divider comprises a reflector movable between a first position to direct light from the first outer lens along the first optical path, and a second position to direct light from the second outer lens along the second optical path.

10. The computing device of claim 9, further comprising an actuator to displace the reflector linearly between the first position and the second position.

11. The computing device of claim 9, further comprising an actuator to rotate the reflector between the first position and the second position.

12. The computing device of claim 1, further comprising:
   a controller configured to:
      receive an image capture command associated with one of the first outer lens and the second outer lens;
      select one of the first and second capture regions of the image sensor based on the image capture command; and
      generate an image from output of the selected capture region.

13. The computing device of claim 12, further comprising:
   an actuator to move the optical divider between a first position for directing light from the first outer lens along the first optical path, and a second position for directing light from the second outer lens along the second optical path;
   wherein the controller is further configured to: control the actuator to position the optical divider in one of the first position and the second position.

14. The computing device of claim 12, wherein the command includes one of a barcode scanning command and an image capture command; and
   wherein controller is further configured to select the first capture region in response to receiving a barcode scanning command.

15. The computing device of claim 14, wherein the first capture region corresponds is a smaller portion of a total area of the image sensor than the second capture region.

16. A method in a computing device, the method comprising:
   at a processor of the computing device, receiving an image capture command;
   selecting, based on the image capture command, at least one of (i) a first capture region of an image sensor of the computing device and (ii) a second capture region of the image sensor;
   selecting a configuration for an optical divider of the computing device, the optical divider configured to (i) direct light from a first outer lens along a first optical path towards the first capture region, and (ii) direct light from a second outer lens along a second optical path towards the second capture region;
   activating the image sensor according to the selected at least one capture region; and
   storing captured image data responsive to activating the image sensor.

17. A computing device, comprising:
   a housing having a plurality of sides defining a housing interior;
   a first cover lens disposed on a first side of the housing, the first cover lens defining a first FOV having a first FOV axis;
   a second cover lens disposed on a second side of the housing, the second cover lens defining a second FOV having a second FOV axis, wherein the first FOV axis and the second FOV axis are substantially co-axial;
   an image sensor in the housing interior;
   an optical divider in the housing interior, the optical divider configured to (i) direct light from the first outer lens along a first optical path, and (ii) direct light from the second outer lens along a second optical path; and
   a lens assembly between the optical divider and the image sensor, the lens assembly configured to (i) focus light received along the first optical path onto at least a first portion the image sensor, and (ii) focus light received along the second optical path onto at least a second portion of the image sensor.

18. The computing device of claim 17, wherein the first portion of the image sensor and the second portion of the image sensor overlap.

* * * * *